United States Patent [19]
Shimura

[11] Patent Number: 5,266,134
[45] Date of Patent: Nov. 30, 1993

[54] RIB MOUNTING METHOD FOR ENDLESS BELT

[75] Inventor: Shoichi Shimura, Yokohama, Japan

[73] Assignee: Canon Kabushiki Kaisha, Tokyo, Japan

[21] Appl. No.: 852,973

[22] Filed: Mar. 17, 1992

[30] Foreign Application Priority Data

Mar. 19, 1991 [JP] Japan .................................. 3-054449

[51] Int. Cl.⁵ .......................... G03G 15/20; B65H 5/02
[52] U.S. Cl. ..................................... 156/84; 156/137; 156/229; 156/293; 355/289
[58] Field of Search ................. 156/137, 229, 293, 84; 355/289; 198/847, 821; 474/271

[56] References Cited

U.S. PATENT DOCUMENTS

| | | | |
|---|---|---|---|
| 3,841,940 | 10/1974 | Rubinich | 156/229 X |
| 5,017,969 | 5/1991 | Mitomi | 355/271 |
| 5,119,143 | 6/1992 | Shimura | 355/289 |

FOREIGN PATENT DOCUMENTS

| | | | |
|---|---|---|---|
| 59-104908 | 6/1984 | Japan | 156/229 |
| 3-25477 | 2/1991 | Japan . | |
| 4-9989 | 1/1992 | Japan | 355/289 |

*Primary Examiner*—Jeff H. Aftergut
*Attorney, Agent, or Firm*—Fitzpatrick, Cella, Harper & Scinto

[57] ABSTRACT

A method of bonding a rib on an endless belt includes applying a bonding material on the endless belt increasing a circumferential length of an endless rib and collaring the rib having the increased circumferential length on a portion of the endless belt where the bonding material is applied.

12 Claims, 3 Drawing Sheets

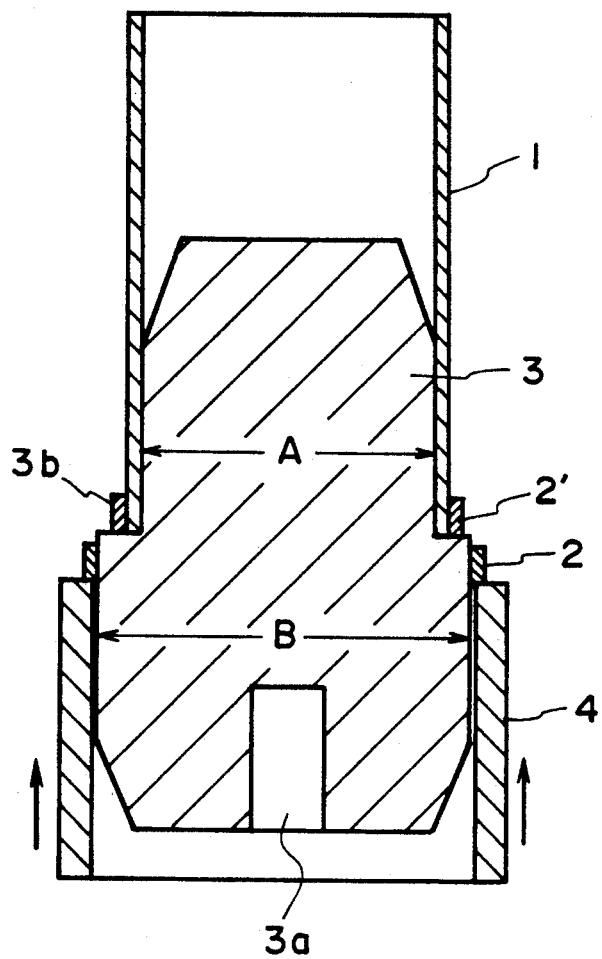
F I G. 1
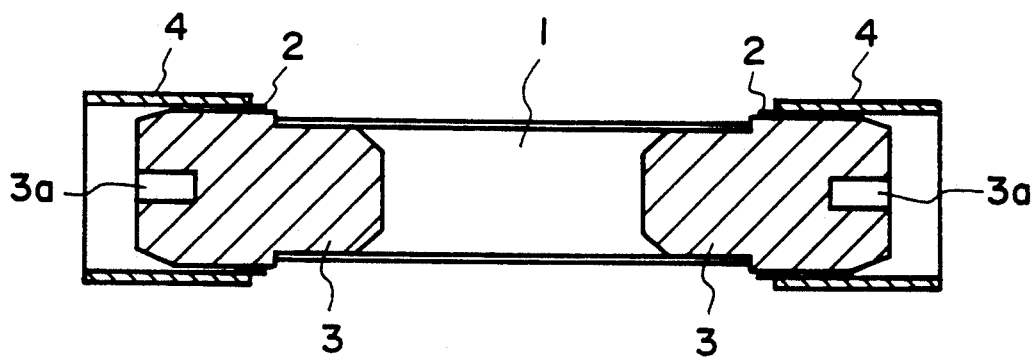
F I G. 2

RIB MOUNTING METHOD FOR ENDLESS BELT

FIELD OF THE INVENTION AND RELATED ART

The present invention relates to a method for mounting a rib to an endless belt which is usable in a heating apparatus for fixing images or for improving surface quality of the fixed image in a copying machine, photoprinter or another image forming machines.

Heat roller type fixing machines are widely used to fix toner images on recording materials, in which the recording material is passed through a nip formed between a heat roller and a pressing roller. This system, however, involves a problem of a long warm-up period until the surface temperature of the heating roller reaches a predetermined operable level.

U.S. patent application Ser. No. 206,767 or the like which has been assigned to the assignee of this application has proposed an image fixing device using an endless thin film. This reduces significantly or eliminates the warming-up period. In this apparatus, however, when the endless belt is driven, the belt laterally shifts in a direction perpendicular to the driving direction.

In order to confine the lateral shift, Japanese Laid-Open Patent Application No. 25477/1991 has proposed provision of a rib at a lateral end of the endless belt. General rib mounting methods for an endless belt other than the endless belt for the fixing or the image improving heating, include:

(1) a method in which a ring-like rib is contacted to the endless belt, and a bonding agent is applied to the gap therebetween; and (2) a method in which a bonding agent is applied to the part of the endless belt, and thereafter, a rib in the form of a string is wrapped therearound.

However, these methods involve the problem that the bonding agent is not applied uniformly with the result of uneven bonding strength and that the rib is easily peeled off from the weak bonding portion in the case (1), and that when the endless belt or film is driven, the connection between the ends of the rib is easily disconnected when it passes by a portion having a large curvature.

SUMMARY OF THE INVENTION

Accordingly, it is a principal object of the present invention to provide a method for mounting a rib to an endless belt in which the bonding strength therebetween is uniform.

It is another object of the present invention to provide a rib mounting method to an endless belt in which the rib is not easily peeled off the endless belt.

According to an aspect of the present invention, a rib mounting method includes applying a bonding agent on an endless belt, expanding a circumferential length of an endless rib and collaring the rib on the bonding agent applied portion of the endless belt.

These and other objects, features and advantages of the present invention will become more apparent upon consideration of the following description of the preferred embodiments of the present invention taken in conjunction with the accompanying drawings.

BRIEF DESCRIPTION OF THE DRAWINGS

FIG. 1 is a sectional view of a mounting device for mounting a ring-like rib on a lateral end portion of the endless film.

FIG. 2 is a sectional view of a bonding device for mounting ring-like ribs to respective lateral ends of the endless film.

DESCRIPTION OF THE PREFERRED EMBODIMENTS

Figure 3:
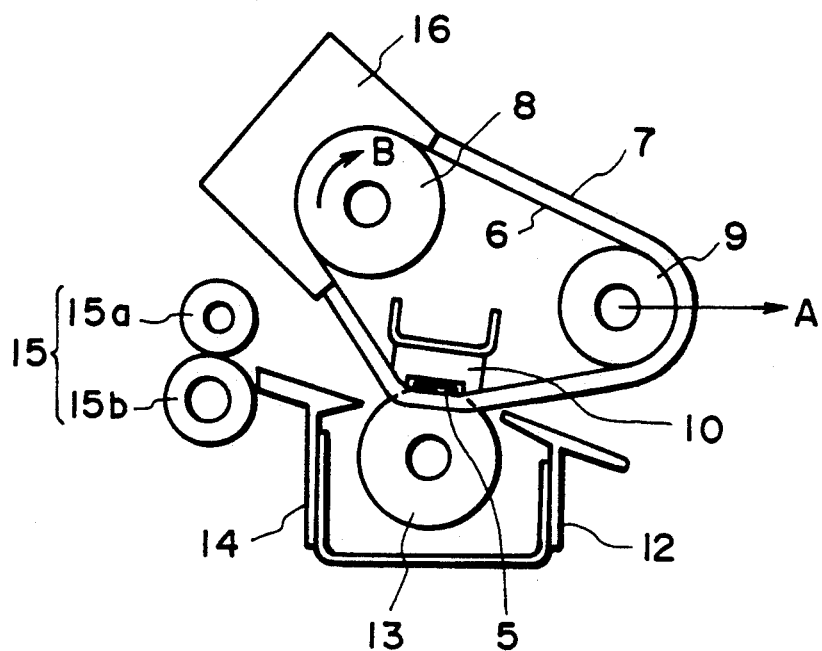
FIG. 3 is a sectional view of a heat-fixing apparatus having the endless fixing film with a ringlike rib at a lateral end thereof which has been mounted through the process according to the present invention.

Referring to the accompanying drawings, the preferred embodiments of the present invention will be described.

Referring to FIG. 1, there is shown a machine for bonding a rib on an endless belt, according to an embodiment of the present invention. In the FIG., reference numeral 1 designates an endless belt film, 2 and 2' designate ring-like ribs in the form of an endless string made of elastomer material, in which 2' designates the rib after it is bonded on the endless film. The bonding machine comprises a fixing member for fixing the endless film and the ring-like rib at the proper positions. The fixing member may be mounted on a unshown turn table. To permit this, it is provided with a hole 3a for fixing it on the turn table.

In order to permit easy mounting of the endless film 1 and the rib 2, the fixing member 3 is tapered at the opposite end portions. The fixing member is provided with a stepped portion 3b, to which the lateral end of the film is abutted, so that it is fixed thereon. The fixing member 3 preferably has a diameter A at the portion where the endless film 1 is fixed. where A is substantially the inside diameter of the film. A diameter B of the portion where the ring-like rib 2 is fixed is larger than the diameter A, and the diameter B is larger than the outside diameter of the film. In other words, the ring-like rib 2 is set on the bonding device so that the inside circumferential length thereof is longer than the outside diameter of the film. Therefore, when the rib or ring is collared on the film, the bonding agent is not scraped off. The bonding device comprises a sliding member 4 for sliding the rib 2 onto the film 1.

The embodiment will be described in further detail. The endless film is made of polyimide having a thickness of 20 microns and an inside diameter of 32 mm. The film is coated with a polytetrafluoroethylene resin which is made electrically conductive and which has a thickness of 10 microns, except for the portion on which the bonding material is applied. The ring-like rib is made of polyurethane resin material injection molded. It has an inside diameter of 32 mm which is equal to the outside diameter of the film, a thickness of 1.3 mm, a width of 5 mm. The material had a hardness of 80 degrees (JIS, A hardness). The bonding material is elastomer epoxy resin adhesive.

The fixing member 3 has a diameter of 32 mm at the portion A and 35 mm at the portion B, and is made of polytetrafluoroethylene resin, and the sliding member 4 is made of polytetrafluoroethylene resin and had an inside diameter of 35.2 mm which is slightly larger than the outside diameter at the portion B.

In the mounting process:

(1) The ring-like rib 2 is set on the fixing member 3:

(2) The endless film 1 is set on the fixing member 3:

(3) The fixing member 3 is set on a turn table (not shown). and the fixing member 3 is rotated:

(4) The bonding material is applied on the portion 2' of the endless film 1 by an air type dispenser (not shown):

(5) The sliding member 4 is moved to slide the rib 2 to the portion 2' of the endless film 1:

(6) After the bonding material is cured, the endless film 1 is removed from the fixing member 3.

The rib is mounted on the endless film through the process at one lateral end thereof. The rib is incorporated in a heat fixing device for a copying machine shown in FIGS. 3 and 4. It has been confirmed that the rib is not peeled off the film, and the lateral shifting of the endless film can be prevented assuredly, even after 300 continuous hours of operation.

FIG. 3 is a sectional view of a heat fixing device using as the fixing film the endless film produced through the above process.

The fixing device comprises a low thermal capacity linear heater 5 which is stationary in use and which is provided by applying a resistance material which generates heat upon electric power supply thereto on a high thermal conductivity alumina base plate. The electric resistance material is supplied with electric power through connection with a power source at the opposite longitudinal ends. The heater 5 is fixed on a thermally insulative member (holder) 10 having low thermal conductivity and made of heat resistive resin material and on a supporting member 11 having a sufficient rigidity. The power supply is in the form of a pulse wave of DC 100V, frequency of 20 msec, for example. The pulse width is controlled in accordance with the temperature detected by a temperature detecting element and energy emission. Generally, the pulse width is 0.5–5 msec.

The fixing film 6 moves in sliding contact with the temperature controlled heater 5 in a direction indicated by an arrow B. The fixing film 6 is stretched around a driving roller 8, a follower roller 9 and the heater 5.

The fixing film 6 is stretched by urging the follower roller 9 in the direction A, and is moved by the driving roller 8 in the direction B.

The pressing roller 13 is supported on unshown bearings so as to be driven by the film 6. It is urged toward the heater 5 through the film 6 therebetween at a total pressure of 4–7 kg.

Figure 4:
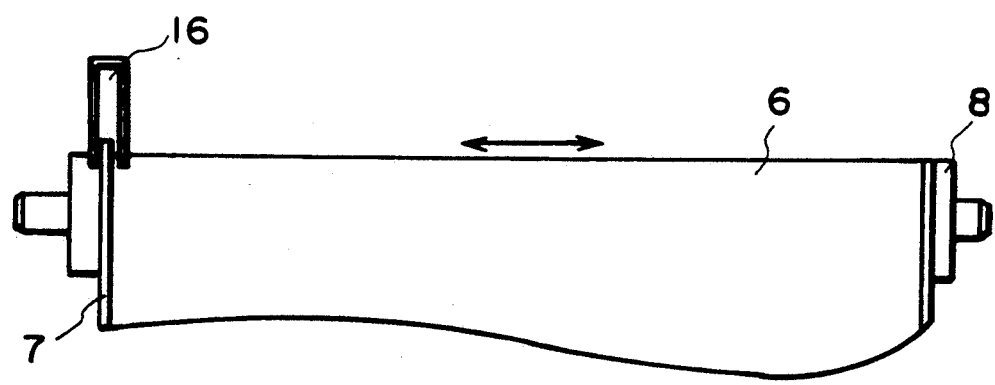
FIG. 4 is a view of the apparatus of FIG. 3, as seen from an upper right view.

FIG. 4 is a view as seen from the upper right in FIG. 3. A confining member 16 is disposed inside the rib 7 along the outer periphery of the driving roller 8 to confine the rib 7. Even if the film 6 is laterally deviated or shifted in the direction of the arrow, the rib 7 abuts the confining member 16, so that the lateral shift of the film is confined.

In the above structure, the recording material not shown is fed on the inlet guide 17 into the nip formed between the film 6 and the pressing roller 13. The toner image on the recording material is heated and fused by the heat and pressure applied by the heater 5 and the pressing roller 13. The recording sheet is then passed through the nip without production of crease or jam and is discharged to the outside of the apparatus by the discharging rollers 15, after being separated by a separation guide 14.

The bonding strength of the rib was measured through a 90 degrees peeling method, and it was 190–230 g. It was confirmed that the uniform bonding strength was provided along the entire circumference thereof.

The endless film used in this invention is preferably a thin endless film having a thickness of approximately 20 microns and made of metal such as stainless steel, aluminum or the like or heat resistive resin material such as polyethylene terephthalate, polyphenylene sulfide, liquid crystal aromatic polyester resin, polyether ether ketone, polysulfone, polyether sulfone, polyether imide, polyimide resin material or the like. For the purpose of preventing toner offset, it is preferable that the above material is coated with a parting layer having a thickness smaller than the thickness of the above heat resistive base material. The preferable material of the parting layer is fluorine resin such as polytetrafluoroethylene resin which has been made electrically conductive by dispersing carbon or the like. The parting layer is provided on the outside of the endless film. In the case of using the parting layer, the portion of the endless film on which the rib is to be bonded preferably does not have the parting layer for the purpose of increasing the bonding strength between the rib and the film.

For the purpose of maintaining sufficient heat transfer from the heater, the total thickness of the film is preferably not more than 50 microns.

Examples of the materials of the rib include styrene butadiene rubber, nitrile rubber, chloroprene rubber, ethylene propylene perpolymer, butyl rubber, isoprene rubber, silicone rubber or the like; thermoplastic ethylene elastomer, thermoplastic olefin elastomer, thermoplastic polyvinyl chloride elastomer, thermoplastic urethane elastomer, thermoplastic polyester elastomer, thermoplastic polyamide elastomer, thermoplastic fluorine containing elastomer, thermoplastic chlorinated polyethylene elastomer or the like. The rib preferably has an inside diameter which is substantially equal to the outside diameter of the film.

The usable bonding or adhesive materials include rubber bonding agent of neoprene, chloroprene or the like type, melamine resin adhesive, phenol resin adhesive, epoxy adhesive, vinyl acetate adhesive, ethylene vinyl acetate adhesive, cyanoacrylate adhesive, polyurethane adhesive or the like.

The fixing member and the sliding member for the endless film and the rib may be made of usual structural materials such as metal, ceramics, plastic material or the like. In consideration of the sliding nature between the fixing member and the sliding member and of the easiness of peeling when the bonding material is deposited, they are preferably made of poor bonding material such as tetrafluoroethylene or another fluorine containing resin, polyoxymethylene, polyphenylene sulfide or the like. The surface coating of fluorine containing resin is also preferable.

The diameter A of the portion on which the endless film is fixed is preferably smaller than a diameter B of the portion on which the rib is fixed. However, the difference between the diameters A and B is limited from the standpoint of avoiding the plastic deformation of the rib.

FIG. 2 is a sectional view of an apparatus according to another embodiment of the present invention. In this FIG., the same reference numerals as in FIG. 1 are assigned to the elements having the corresponding functions, and the detailed descriptions thereof are omitted for simplicity. In this embodiment, the ring-like ribs 2 are simultaneously mounted to the respective lateral end portions of the endless film 1. The fixing member 3 is fixed on a turn table at the portions 3a. The endless film 1, the rib 2, the fixing member 3, the sliding member 4 have the same dimension and are of the same material as in the foregoing embodiment. In this case, however, the ring-like ribs 2 are bonded to both of the lateral end portions endless film 1. The endless film thus produced is incorporated as a fixing film in a heat fixing device of the copying machine shown in FIGS. 5 and 6. It has been confirmed that the ribs are not peeled off the endless film, and the lateral shifting of the endless film has been assuredly prevented, even after the apparatus is continuously operated for 300 hours. The bonding strength determined by 90 degrees peeling method was 180–220 g, and was uniform over the entire circumference.

Figure 5:
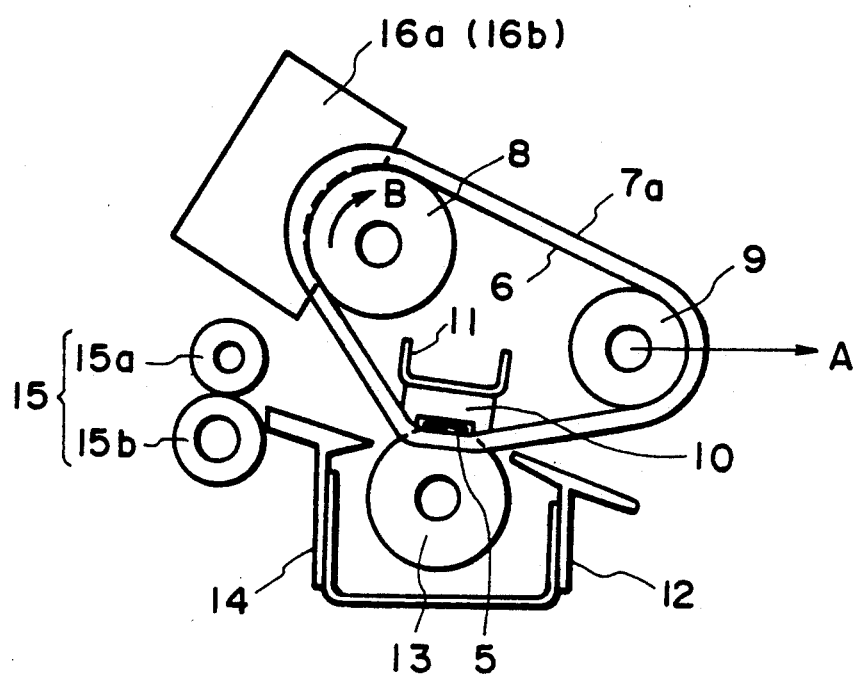
FIG. 5 is a sectional view of a heat fixing apparatus having an endless fixing film with ring-like ribs at both lateral ends thereof which have been mounted through the process according to an embodiment of the present invention.

The structure shown in FIG. 5 is fundamentally the same as shown in FIGS. 3 and 4, except that two confining members 16a and 16b are provided to confine the respective ribs.

Figure 6:
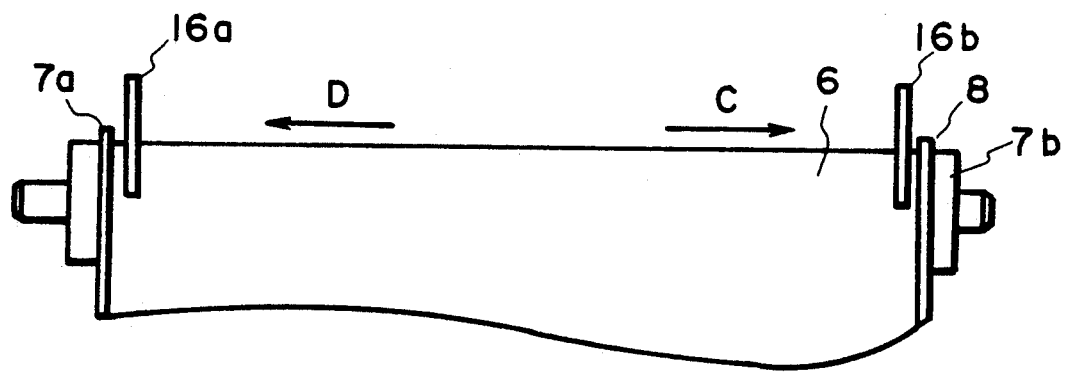
FIG. 6 is a view of the apparatus of FIG. 5, as seen from an upper right view.

FIG. 6 is a view as seen from the upper right in FIG. 5. The confining members 16a and 16b are disposed inside the ribs 7a and 7b, respectively, along the outer circumference of the driving roller 8 to confine the ribs 7a and 7b, respectively. Even if the film 6 is deviated in the direction C, the rib 7a abuts the confining member 16a, so that the lateral shift is limited. On the contrary, if the film deviates in the direction D, the rib 7b is confined by the confining member 16b, so that the lateral shift is stopped.

COMPARISON EXAMPLE 1

The ring-like rib was set on the endless film, and epoxy elastomer adhesive was supplied into the clearance therebetween, by which the rib was bonded to one end portion of the endless film. The endless film and the rib had the same dimensions as in the first embodiment and was made of the same materials as in the first embodiment. The thus produced endless film was incorporated as the fixing film in the heat fixing device shown in FIGS. 3 and 4. The rib was peeled off the endless film after approximately 10 hours operation with the result that the lateral shifting of the endless film could not be prevented sufficiently. The bonding strength was measured (90 degrees peeling method), it was found 50–220 g (non-uniform).

COMPARISON EXAMPLE 2

The ring-like rib used in the first embodiment was cut into a non-endless rib, and it was wrapped on the endless film coated with the bonding material. The dimensions and materials of the endless film and the bonding material were the same as in the first embodiment.

The thus produced endless film was incorporated as the fixing film in the fixing apparatus shown in FIGS. 3 and 4. The rib was disconnected at the longitudinal ends thereof after approximately 5 hours of operation. The endless film was not prevented from the lateral shifting for a sufficiently long term.

As described hereinbefore, according to the present invention, the rib can be bonded to the endless belt with uniform bonding strength over the entire circumference.

While the invention has been described with reference to the structures disclosed herein, it is not confined to the details set forth and this application is intended to cover such modifications or changes as may come within the purposes of the improvements or the scope of the following claims.

What is claimed is:

1. A method of bonding a rib on an endless belt, comprising the steps of:
   preparing a fixing member having a first fixing portion and a second fixing member portion having a diameter larger than that of the first fixing portion;
   fixing the endless belt on the first fixing portion;
   expanding a rib and fixing the expanded rib on the second fixing portion;
   applying a bonding material on the endless belt; and
   sliding the rib toward the first fixing portion and permitting the rib to shrink into contact with the applied bonding material.

2. A method according to claim 1, wherein the rib is of elastomer material.

3. A method according to claim 2, wherein the elastomer material is polyurethane resin material.

4. A method according to claim 1, wherein the bonding material is elastic.

5. A method according to claim 1, wherein the rib is slid by a sliding member to the endless belt, by which the rib is collared on the endless belt.

6. A method according to claim 1, wherein the fixing member is provided with a stepped portion where an end of the endless belt is fixed.

7. A method of bonding a rib on an endless belt usable with a heating device comprising a heater, the endless belt movable together with a recording material and having a rib at a lateral end portion thereof, and a confining member for confining the rib, in which an image on the recording material is heated by heat from the heater through the endless belt, comprising the steps of:
   preparing a fixing member having a first fixing portion and a second fixing portion having a diameter larger than that of the first fixing portion;
   fixing the endless belt on the first fixing portion;
   expanding a rib and fixing the expanded rib on the second fixing portion;
   applying a bonding material on the endless belt; and
   sliding the rib toward the first fixing portion and permitting the rib to shrink into contact with the applied bonding material.

8. A method according to claim 7, wherein the rib is of elastomer material.

9. A method according to claim 8, wherein the elastomer material is polyurethane resin material.

10. A method according to claim 7, wherein the bonding material is elastic.

11. A method according to claim 7, wherein the rib is slid by a sliding member to the endless belt, by which the rib is collared on the endless belt.

12. A method according to claim 7, wherein the fixing member is provided with a stepped portion where an end of the endless belt is fixed.

* * * * *

UNITED STATES PATENT AND TRADEMARK OFFICE
CERTIFICATE OF CORRECTION

PATENT NO. : 5,266,134
DATED : November 30, 1993
INVENTOR(S) : Shimura

It is certified that error appears in the above-indentified patent and that said Letters Patent is hereby corrected as shown below:

<u>COLUMN 6</u>:

Line 17, "member" should be deleted.

Signed and Sealed this

Sixteenth Day of August, 1994

Attest:

BRUCE LEHMAN

Attesting Officer          Commissioner of Patents and Trademarks